United States Patent
Bau

(10) Patent No.: US 7,650,591 B2
(45) Date of Patent: Jan. 19, 2010

(54) MARSHALING AND UN-MARSHALING DATA TYPES IN XML AND JAVA

(75) Inventor: David Bau, Gladwyne, PA (US)

(73) Assignee: BEA Systems, Inc., Redwood Shores, CA (US)

( * ) Notice: Subject to any disclaimer, the term of this patent is extended or adjusted under 35 U.S.C. 154(b) by 569 days.

(21) Appl. No.: 10/762,814

(22) Filed: Jan. 22, 2004

(65) Prior Publication Data

US 2004/0216086 A1     Oct. 28, 2004

Related U.S. Application Data

(60) Provisional application No. 60/442,673, filed on Jan. 24, 2003.

(51) Int. Cl.
*G06F 9/44*     (2006.01)

(52) U.S. Cl. ........................................ 717/116; 717/114

(58) Field of Classification Search ......... 717/103–105, 717/108, 137–145, 100, 114–123; 706/45
See application file for complete search history.

(56) References Cited

U.S. PATENT DOCUMENTS

| | | | |
|---|---|---|---|
| 5,321,841 A | 6/1994 | East et al. | |
| 5,961,593 A | 10/1999 | Gabber et al. | |
| 6,012,083 A | 1/2000 | Savitzky et al. | |
| 6,067,623 A | 5/2000 | Blakley et al. | |
| 6,070,184 A | 5/2000 | Blount et al. | |
| 6,148,336 A | 11/2000 | Thomas et al. | |
| 6,185,734 B1 | 2/2001 | Saboff et al. | |
| 6,212,546 B1 | 4/2001 | Starkovich et al. | |
| 6,230,309 B1 | 5/2001 | Turner et al. | |
| 6,237,135 B1 | 5/2001 | Timbol | |
| 6,243,737 B1 | 6/2001 | Flanagan et al. | |
| 6,338,064 B1 | 1/2002 | Ault et al. | |
| 6,367,068 B1 | 4/2002 | Vaidyanathan et al. | |
| 6,480,865 B1* | 11/2002 | Lee et al. ..................... | 715/234 |
| 6,594,823 B1* | 7/2003 | Corbin et al. ............... | 717/143 |
| 6,604,198 B1 | 8/2003 | Beckman et al. | |
| 6,643,652 B2 | 11/2003 | Helgeson et al. | |
| 6,662,357 B1 | 12/2003 | Bowman-Amuah | |
| 6,721,740 B1 | 4/2004 | Skinner et al. | |
| 6,721,779 B1 | 4/2004 | Maffeis | |
| 6,754,884 B1* | 6/2004 | Lucas et al. .................. | 717/108 |

(Continued)

OTHER PUBLICATIONS

Diaz et al., "Inter-organizational Document Exchange: Facing the Conversion Problem with XML," Mar. 2002, ACM, p. 1043-1047.*

(Continued)

*Primary Examiner*—Wei Y Zhen
*Assistant Examiner*—Qing Chen
(74) *Attorney, Agent, or Firm*—Fliesler Meyer LLP

(57) ABSTRACT

The use of XML types can allow the combination of XML and JAVA® type systems, which overcomes many deficiencies in existing marshaling and unmarshaling systems by translating XML schemas which define XML data in an XML document into XML types in JAVA®. Unlike traditional attempts at translating between XML and JAVA®, XML schemas realized as XML types can remain fully faithful to the XML, and are capable of a number of XML data operations. In addition, the XML types can be easily transformed among themselves and JAVA® types, and a lightweight store retaining XML information at tag level allows incremental XML marshaling and unmarshaling.

41 Claims, 9 Drawing Sheets

U.S. PATENT DOCUMENTS

| | | | |
|---|---|---|---|
| 6,792,466 B1 * | 9/2004 | Saulpaugh et al. | 709/229 |
| 6,795,967 B1 | 9/2004 | Evans et al. | |
| 6,802,000 B1 | 10/2004 | Greene et al. | |
| 6,832,238 B1 | 12/2004 | Sharma et al. | |
| 6,836,883 B1 | 12/2004 | Abrams et al. | |
| 6,850,979 B1 * | 2/2005 | Saulpaugh et al. | 709/225 |
| 6,859,180 B1 * | 2/2005 | Rivera | 343/709 |
| 6,859,810 B2 * | 2/2005 | Andrei et al. | 707/102 |
| 6,918,084 B1 * | 7/2005 | Slaughter et al. | 715/513 |
| 6,918,107 B2 * | 7/2005 | Lucas et al. | 717/124 |
| 6,922,827 B2 * | 7/2005 | Vasilik et al. | 717/140 |
| 6,950,875 B1 * | 9/2005 | Slaughter et al. | 709/230 |
| 6,970,869 B1 * | 11/2005 | Slaughter et al. | 707/10 |
| 6,973,493 B1 * | 12/2005 | Slaughter et al. | 709/225 |
| 6,990,654 B2 * | 1/2006 | Carroll, Jr. | 717/109 |
| 7,043,722 B2 * | 5/2006 | Bau, III | 717/151 |
| 7,072,934 B2 | 7/2006 | Helgeson et al. | |
| 7,073,167 B2 | 7/2006 | Iwashita | |
| 7,080,078 B1 * | 7/2006 | Slaughter et al. | 707/10 |
| 7,089,584 B1 | 8/2006 | Sharma | |
| 7,149,752 B2 * | 12/2006 | Mangan | 707/103 R |
| 7,155,705 B1 * | 12/2006 | Hershberg et al. | 717/137 |
| 7,165,041 B1 | 1/2007 | Guheen et al. | |
| 7,181,731 B2 | 2/2007 | Pace et al. | |
| 7,260,599 B2 * | 8/2007 | Bauch et al. | 709/202 |
| 7,260,818 B1 | 8/2007 | Iterum et al. | |
| 2001/0029604 A1 * | 10/2001 | Dreyband et al. | 717/7 |
| 2002/0010781 A1 | 1/2002 | Tuatini | |
| 2002/0049788 A1 | 4/2002 | Lipkin et al. | |
| 2002/0078365 A1 | 6/2002 | Burnett et al. | |
| 2002/0116454 A1 | 8/2002 | Dyla et al. | |
| 2002/0169644 A1 | 11/2002 | Greene | |
| 2002/0188486 A1 | 12/2002 | Gil et al. | |
| 2003/0018832 A1 | 1/2003 | Amirisetty et al. | |
| 2003/0018963 A1 | 1/2003 | Ashworth et al. | |
| 2003/0023957 A1 | 1/2003 | Bau et al. | |
| 2003/0028364 A1 | 2/2003 | Chan et al. | |
| 2003/0041198 A1 | 2/2003 | Exton et al. | |
| 2003/0074217 A1 | 4/2003 | Beisiegel et al. | |
| 2003/0163603 A1 * | 8/2003 | Fry et al. | 709/328 |
| 2004/0015840 A1 * | 1/2004 | Walker | 717/108 |
| 2004/0103406 A1 | 5/2004 | Patel | |

OTHER PUBLICATIONS

Trentini, Andrea, "A Java-based framework to support computer-assisted creation of structured XML documents," Apr. 2002, ACM, p. 48-53.*

International Search Report Mailed Oct. 31, 2005, PCT.

Muller, "Event-Oriented Dynamic Adaptation of Workflows: Model, Architecture, and Implementation", 2002, University of Leipzig, Germany, 351 pages.

Peltz, "Web Service Orchestration", HP, Jan. 2003, Hewlett Packard, Co., 20 pages.

Ort, et al. "Java Architecture for XML Binding (JAXB)", Mar. 2003, Java-Sun, 14 pages.

Wikipedla, Java Architecture for XML Binding (JAXB), Oct. 2007, 3 pages.

Shannon, "Java™ 2 Platform Enterprise Edition Specification v1.3", Oct. 2000, Chapters 1-11, 170 pages.

* cited by examiner

```
<xsd:schema . . .>
 <xsd:element name="purchase-order">
  <xsd:complexType>
   <xsd:element name="line-item" maxOccurs="unbounded">
    <xsd:complexType>
     <xsd:element name="desc" type="xsd:string"/>
     <xsd:element name="itemid" type="xsd:int"/>
     <xsd:element name="price" type="xsd:float"/>
     <xsd:element name="qty" type="xsd:int"/>
    </xsd:complexType>
   </xsd:element>
  </xsd:complexType>
 </xsd:element>
</xsd:schema>
```

Figure 1

```
/**
/** @xbean:schema-type element="purchase-order" */
interface PurchaseOrder implements XmlObject
{
  /**
   * @xbean:schema-type element="line-item"
   */
  interface LineItem implements XmlObject
  {
    String getDesc();
    void setDesc(String desc);
    int getItemid();
    void setItemid(int itemid);
    float getPrice();
    void setPrice(float price);
    int getQty();
    void setQty(int qty);
  }
  LineItem getLineItem(int index);
  void setLineItem(int index, LineItem lineItem);

int getLineItemCount();

void addLineItem(LineItem lineItem);
  void insertLineItem(int index, LineItem lineItem);
  LineItem insertNewLineItem(int index);

void removeLineItem(int index);
}
```

Figure 3

```
/**
 * @xb:schema
 *  element::
 *    <xsd:element name="myData">
 *      <xsd:sequence>
 *        <xsd:element name="a" type="xsd:string">
 *        <xsd:element name="i" type="xsd:int">
 *      </xsd:seqence>
 *    </xsd:element>
 *    ::
 * @xb:xml-map
 *  map::
 *    <myData>
 *      <a>{a}</a>
 *      <i>{i}</i>
 *    </myData>
 *    ::
 */
class MyData implements XBean
{
    String getA();
    void setA(String a);

int getI();
    void setI(int i);
}
```

*Figure 4*

```
1  /** @jws:operation */
2  PurchaseOrder fixQuantities(PurchaseOrder po)
3  {
4     LineItem[] emptyItems;
5     items = (LineItem[])po.getAllValues(".//line-item[qty=0]");
6     for (int i = 0; i < emptyItems.length; i++)
7        EmptyItems[i].setQty(1);
8     return po;
9  }
```

*Figure 5*

```
1  /** @jws:operation */
2  PurchaseOrder fixQuantities(PurchaseOrder po)
3  {
4    LineItem[] emptyItems;
5    items = (LineItem[])po.getAllValues(".//line-item[qty=0]");
6    for (int i = 0; i < emptyItems.length; i++)
7      emptyItems[i].set(1);
8    items = (LineItem[])po.getAllValues(".//line-item");
9    for (int i = 0; i < emptyItems.length; i++)
10   {
11     int itemid = emptyItems[i].getItemid();
12     emptyItems[i].set(findCatalogItem(emptyItems[i]));
13   }
14   return po;
15 }
```

*Figure 6*

```
<xs:type name="CatalogItem">
  <xs:complexType>
    <xs:sequence>
      <xs:element name="catalogID" type="xs:int"/>
      <xs:element name="description" type="xs:string"/>
      <xs:element name="price" type="xs:float"/>
    </xs:sequence>
  </xs:complexType>
</xs:type>
```

*Figure 7*

```
<xt:transformation
    xmlns:dbtypes="java://dbtypes.mycompany.com/"
    xmlns:po="http://standards.org/po-152"
    xmlns:xsi="... more namespaces ...">
  <xt:input>
    <xt:argument name="input" type="dbtypes:CatalogID"/>
  </xt:input>
  <xt:output type="po:LineItem">
  <xt:xquery><![CDATA[
    <x:value xsi:type="po:LineItem">
      <pi:description>{$input/description}</pi:item-id>
      <pi:itemid>{$input/catalogID}</pi:item-id>
      <pi:price>{$input/price}</pi:item-id>
      <pi:qty>0</pi:qty>
    </x:value>
  ]]></xt:xquery>
</xt:transformation>
```

*Figure 8*

```
9    for (int i = 0; i < emptyItems.length; i++)
10   {
11      int itemid = emptyItems[i].getItemid();
12      int rememberQty = emptyItems[I].getQty();
13      emptyItems[i].set(findCatalogItem(emptyItems[i]));
14      emptyItems[i].setQty(rememberQty);
15   }
```

*Figure 9*

MARSHALING AND UN-MARSHALING DATA TYPES IN XML AND JAVA

CLAIM OF PRIORITY

This application claims priority from the following application, which is hereby incorporated by reference in its entirety:

U.S. Provisional Application No. 60/442,673, entitled XML TYPES TN JAVA, by David Bau, filed Jan. 24, 2003.

CROSS REFERENCE TO RELATED DOCUMENTS

The following related U.S. patent applications and documents are hereby incorporated herein by reference in their entirety:

U.S. patent application Ser. No. 09/898,898, filed Jul. 2, 2001, by Terry Lucas, et al., entitled, "Programming Language Extensions for Processing XML Objects and Related Applications", U.S. Pat. No. 6,754,884, issued Jun. 22, 2004;

U.S. patent application Ser. No. 10/150,436, filed May 17, 2002, by Cezar C. Andrei et al., entitled, "Declarative Specification and Engine for Non-Isomorphic Data Mapping", U.S. Pat. No. 6,859,810, issued Feb. 22, 2005.

Beas Systems Weblogic Workshop Online Help Document entitled, "Annotations Reference", version: 2003.0718.084729, dated Jul. 18,2003.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE INVENTION

The invention relates to the transformation of data and data types.

BACKGROUND

Certain drawbacks exist in the way data is currently transformed, or marshaled, between data types. In existing systems, a user staffs with an existing Java type and asks the system to generate the XML schema that reflects the JAVA® type, and further to marshal the JAVA® data to the XML that was automatically generated. Most products that marshal XML run through a compiler, such as a JAVA® to WSDL compiler, in order to generate an XML schema. One drawback to such an approach is that only the scenario going from JAVA® to XML is addressed. Current tools are not particularly good at taking an existing XML schema and turning that entire schema into a convenient-to-use JAVA® type.

Another problem with current marshaling technologies appears when a user simply wishes to look at a small piece of XML data. That user may prefer to simply pass on the rest of the XML data without processing that data. Current marshaling technologies are not effective at simply passing on the remainder of the data. Typically, going from marshaling to unmarshaling is complicated, as not all semantics in XML can be easily captured in JAVA®. If a user brings in a message, changes a small portion of the message, and tries to resend the message as XML, portions other than that changed by the user will be different, such that a lot of other information may be lost. If the XML contains wildcard attributes or elements, for example, those wildcards will not be retained. Information about element order may also be lost or scrambled, which is a problem if the schema is sensitive to element order.

BRIEF DESCRIPTION OF THE DRAWINGS

FIG. 1 illustrates an exemplary XML schema definition file that can be used in accordance with embodiments of the present invention.

FIG. 3 illustrates exemplary code representing the XML types compiled from an XML schema that can be used in accordance with embodiments of the present invention.

FIG. 4 illustrates exemplary code of an annotation-based format that can be used in accordance with embodiments of the present invention.

FIG. 5 illustrates exemplary code implementing a Web service that can be used in accordance with embodiments of the present invention.

FIG. 6 illustrates exemplary code for type transformation that can be used in accordance with embodiments of the present invention.

FIG. 7 illustrates exemplary code for default type declaration that can be used in accordance with embodiments of the present invention.

FIG. 8 illustrates exemplary code for XML transformation that can be used in accordance with embodiments of the present invention.

FIG. 9 illustrates exemplary code for XML transformation that can be used in accordance with embodiments of the present invention.

DETAILED DESCRIPTION

Figure 2:
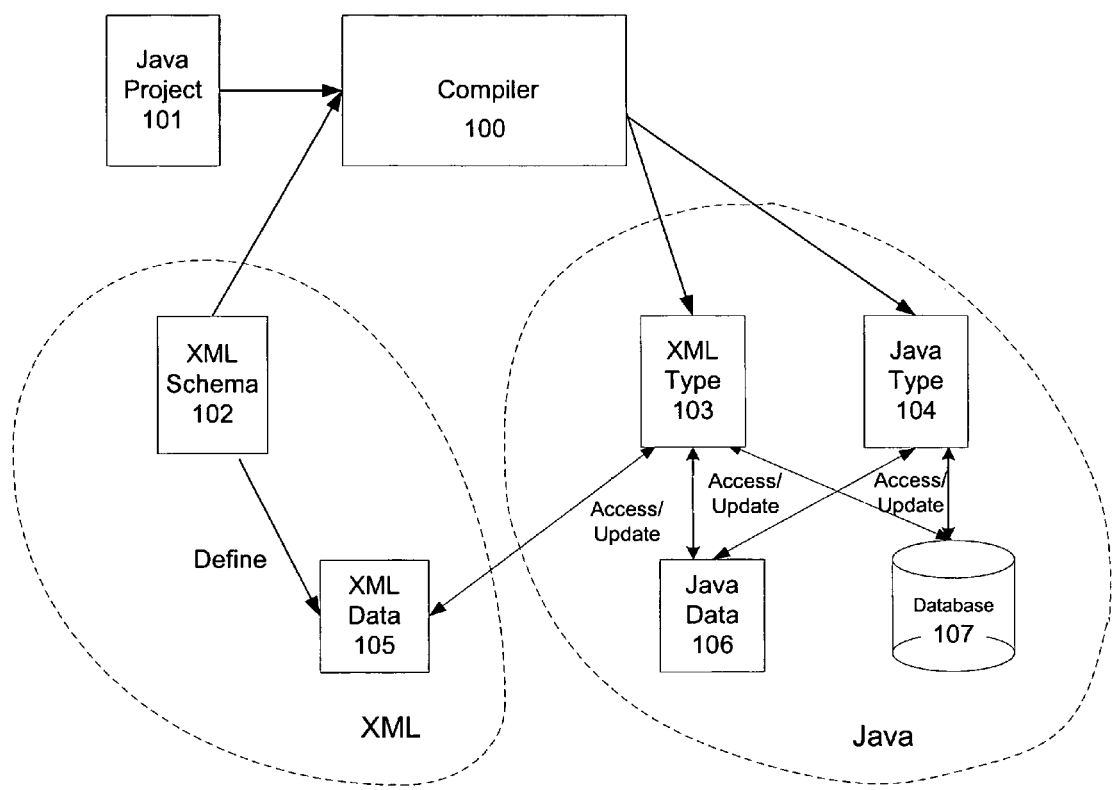
FIG. 2 is a diagram of an exemplary system for XML marshaling and unmarshaling that can be used in accordance with embodiments of the present invention.

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Systems and methods in accordance with one embodiment of the present invention overcome many deficiencies in existing marshaling and unmarshaling systems by translating XML schemas, which define XML data in an XML document, into XML types in JAVA® when marshaling data between XML and JAVA®. XML types are actually JAVA® types which, in addition to regular JAVA® bean functions and access to database, can also access and update XML data within JAVA® in an efficient, type-safe, robust, and convenient way. An architecture can be used in at least one embodiment that provides the ability to handle almost 100% of the schema introduced by a user.

The use of XML types can allow the combination of XML- and JAVA®-type systems. This can be done in a way that allows developers to achieve loose coupling. XML schemas realized as XML types can remain fully faithful to the XML. It can be easy for a developer to take control of precise transformations between existing JAVA® types and existing XML types. XML types can address the JAVA®/XML boundary by bringing together several technologies, including for example schema-aware strongly typed access to XML data document from JAVA®, compact and indexed in-memory XML store, speedy and minimal (pull) parsing and (binary) serialization, lightweight document-cursor traversal, XPath and XQuery navigation and transformation, and seamless JAVA® IDE integration.

For an XML-oriented "XML to XML via JAVA® code" example, FIG. 1 shows a simple exemplary XML schema definition (XSD) file that can be used with embodiments of the present invention. This particular XML schema describes the type of a purchase order. The schema can be a pre-existing file that was generated by a schema tool or created by a user. In this example, it may be necessary to "clean up" or "fix" invalid XML purchase order information.

At the top of the XSD is a schema definition for an element named 'purchase order.' The element is defined as a complex type and contains an element called "line-item." There is a 'maxOccurs' attribute set to 'unbounded,' meaning that the line-item can be repeated any number of times. Each of the line items is shown to have four sub-elements: desc, itemid, price, and qty. The 'desc' sub-element refers to a description element which is a string, 'itemid' refers to an item identifier element which is an integer (type int), 'price' refers to a price element which is a floating point number (type float), and 'qty' refers to a quantity element which is an integer. These sub-elements are all built-in types of the schema. This schema is basically a description or representation of how a valid purchase order schema should look.

In order to write a program using XML types, an XML schema file can be added to a JAVA® project. An example of a system for XML marshaling and unmarshaling is shown in FIG. 2. In one embodiment, the system can process the file with a compiler 100 that knows not only how to compile a JAVA® project 101, but also is capable of compiling the XSD file 102. When XSD file is compiled, a number of XML types 103 can be generated in addition to regular JAVA® types 104. These XML types can then be added to the classpath. For example, an XML type called "purchase order" can be generated from the schema type called "purchase-order."

A JAVA® source code representation of the XML types compiled from the example schema in FIG. 1 is shown in FIG. 3, where the source that generates these JAVA® types is the schema file itself. A type called LineItem corresponds to the line item-element nested inside the purchase-order element in the XSD file. In JAVA®, the XML line-item element can turn into something similar. For each element inside a type, a JAVA® field can be generated. For the "desc" element in the XSD, for instance, there are corresponding "getDesc" and "setDesc" methods in the generated type for each line item. For the purchase order as a whole, a user can obtain or send an individual line item. The names of the generated types can be automatically derived from the schema names. Each generated type can be annotated with the relevant schema name from which it comes. Each type can also extend an existing XML type.

In one embodiment, XML types can implement a common base XML type called "XMLObject". Such an XML type provides the ability to execute a number of XML-oriented data manipulations and will be referred to herein as an "XBean". An XBean is not a standard JAVA® bean as an XBean inherits from an XMLObject. An XMLObject is unusual, in that an XMLObject as an XML type provides a way for each XBean to retrieve its original, or corresponding, XML. An XBean can be thought of as a design pattern for JAVA® types representing data, such as business data, that can be serialized and de-serialized to XML, as well as accessed in a type-safe way from JAVA®. XBeans can also be thought of as a small set of natural language idioms, either annotated JAVA® or non-JAVA®, for generating those types. Normally, there is a tradeoff when an application developer or component developer decides how to represent business data. If the data is represented as type-safe JAVA®, then serialization to XML or to databases can be awkward. If the data is represented as XML, then conversion to JAVA® types can also be somewhat awkward. The same holds true for conversion to either of the other types if data is in a result set from a database. It is therefore advantageous to provide a single category of JAVA® types that is convenient for passing, using, and manipulating as both XML and JAVA®. It is further advantageous that the same type is convenient for database access as well as form input and validation.

As Shown in FIG. 2, XBeans in one embodiment can sit at the intersection of three types of business data: XML data 105, JAVA® data 106, and database 107. An XBean can simply contain data, without any logic or means for communication or computation. An XBean can be defined using any of a number of idioms. Once an XBean is defined, the XBean can be used in various contexts. For example, an XBean can be defined using XML schema, then instantiated by attaching the XBean to an XML input stream. In this case, the JAVA® types that are generated can be passed around and used as a JAVA® bean with friendly getters and setters.

For example, an application developer could define a file called MyData.schemabean, with the following contents:

```
<xsd:element name="myData">
    <xsd:sequence>
        <xsd:element name="a" type="xsd:string">
        <xsd:element name="i" type="xsd:int">
    </xsd:seqence>
</xsd:element>
```

This file could compile into a XBean with metadata, such as in FIG. 4, which shows an exemplary annotation-based format, which would be another way of expressing an XBean.

If the data was XML-oriented, for example, a user might have cared whether a name came before a description or a description came before a name. Systems and methods in accordance with the present invention allow a user to get back to the original, ordered XML. There can be any of several methods on a base XMLObject type, such as methods called "getXMLCursor" and "executeXPath." An XML type can have a number of XML data operations, including methods to query values using XPath, transform values using XQuery, or iterate over the data document using an XMLCursor. This base type can hold several technologies together.

Certain methods can determine what the XML looks like at any point in time. For example, XML types can be used to implement a Web service that executed the requested operation such as shown in FIG. 5. The exemplary code in this FIG. can be used to fix quantities in an entire purchase order. On lines 1-2 of the Figure, the method is declared as a Web service operation that takes a PurchaseOrder XML type. The Web services runtime can recognize XML types and pass incoming messages efficiently, without fully parsing the XML. The other XML type that was declared in the schema is LineItem, which can be seen on lines 4, 5, and 7 as an array called emptyItems. Since the compiled XML types are strongly typed, they allow validation of both schema, such as validating PurchaseOrder against a schema file, and JAVA® compiler checking, such as verifying that the type of the argument of emptyItems[i].setQty(1) is an integer.

For instance, a user might receive a number of purchase orders with high line items that have erroneously set the line item with quantity 0. That user may wish to manipulate these purchase orders, such that whenever somebody leaves a quantity field set to 0, the system changes that quantity field to 1. A function can take a purchase order XBean as input, and an XPath can be executed on the purchase order which looks for any line item tags underneath the purchase order tag that have quantity equal to 0. This is shown, for example, starting at line 5 in the Figure. A list of nodes can be returned to the user that match the XPath. That list of nodes can be cast back to the XBean type that the user knows it to be. The system selects a set of line items that can be cast to an array. Once the results are obtained from XPath, it is possible to iterate through the results and use an XBean method to manipulate the result nodes.

Strongly typed JAVA® accessors may not be appropriate for all XML usage. In one embodiment, XML types can extend a base XML-oriented XMLObject type that provides, for example, XPath, XQuery, XMLCursor, and XMLReader. On line 5, the XMLObject getAllValues method executes an XPath on the input to locate all line item elements with qty=0. On lines 6 and 7, it can be seen that the LineItem types can be used to update the XML data document. Each instance of the type refers to a specific node in the document, and when methods such as setQty(1) are called, the data of the document are being manipulated in an easy, type-safe way. On line 8, the type is returned directly from the Web service to complete the function and send the response message.

Systems and methods in accordance with embodiments of the present invention can also deal with transformation among different XML types, where a user may need to process an XBean to retrieve data. For example, it may be necessary to clean up the line items by modifying the description and price to match the item ID. This can be done in one example by looking up each catalog item in an existing application database. This work can be done using a JAVA® lookup method that can take an integer item id and return a CatalogItem type. For instance:

```
CatalogItem findCatalogItem(int catalogID);
class CatalogItem
{
    int getCatalogID( );
    String getDescription( );
    float getPrice( );
}
```

This class appears to be similar to a LineItem XML type, but has some relatively minor differences. For instance, CatalogItem has no quantity and the item ID is called a "catalogID" rather than an "itemID." In fact, since CatalogItem is so similar to LineItem, it may be desirable in some situations to write code such as that shown in FIG. 6. In the FIG. the value of a complex XML type, LineItems, is being set to a complex JAVA type, CatalogItem. Each XML type has a set method that can take an arbitrary type, such that the above code can compile and run. At runtime, however, the user can get an XML conversion exception, complaining "No Transformation has been defined mapping from CatalogItem to LineItem". In such case, the user can select the appropriate CatalogItem type name and check the corresponding XML transformation. If a user has an existing bean that looks up the title of an item and returns a JAVA type called 'CatalogItem,' CatalogItem will have a CatalogID description that looks like the line items, but is slightly different than the prior example. For example, there is no quantity field, and what was previously called "ItemID" is now called CatalogID.

In systems and methods in accordance with embodiments of the present invention, each XML transformation can be implemented using an XQuery stored in a directory of transformations. Each XQuery can transform from one or more types, each with a known XML schema, into a specific type. A visual XQuery editor can be used that has input and output types pinned to the line-item type, as well as the default type for CatalogItem. An XQuery editor can allow a system or user to connect itemID to catalogID, and to indicate that the quantity should be zero.

An example of a default type declaration for the CatalogItem class is shown in FIG. 7. It can be visually written by XQuery into a file in a directory that contains all the transformations. An XQuery can be defined that tells the system how to transform a catalog item into a regular line item. An example of such a query is shown in FIG. 8. The bolded text in FIG. 8 corresponds to an XQuery that maps catalogID into itemId and sets the extra field qty to 0. The remainder is an envelope that holds the XQuery in an XML file. This 0 value can be corrected, such as can be done in JAVA® as shown in FIG. 9. On line 13 in FIG. 9, exemplary code can be seen where the catalog item is being sent into the items line. It can be desirable to take a catalog item that a user is getting from an existing API and get that item into an XBean that will represent a line item. Such code would not normally work, as the catalog item is different from the line item.

Figure 10:
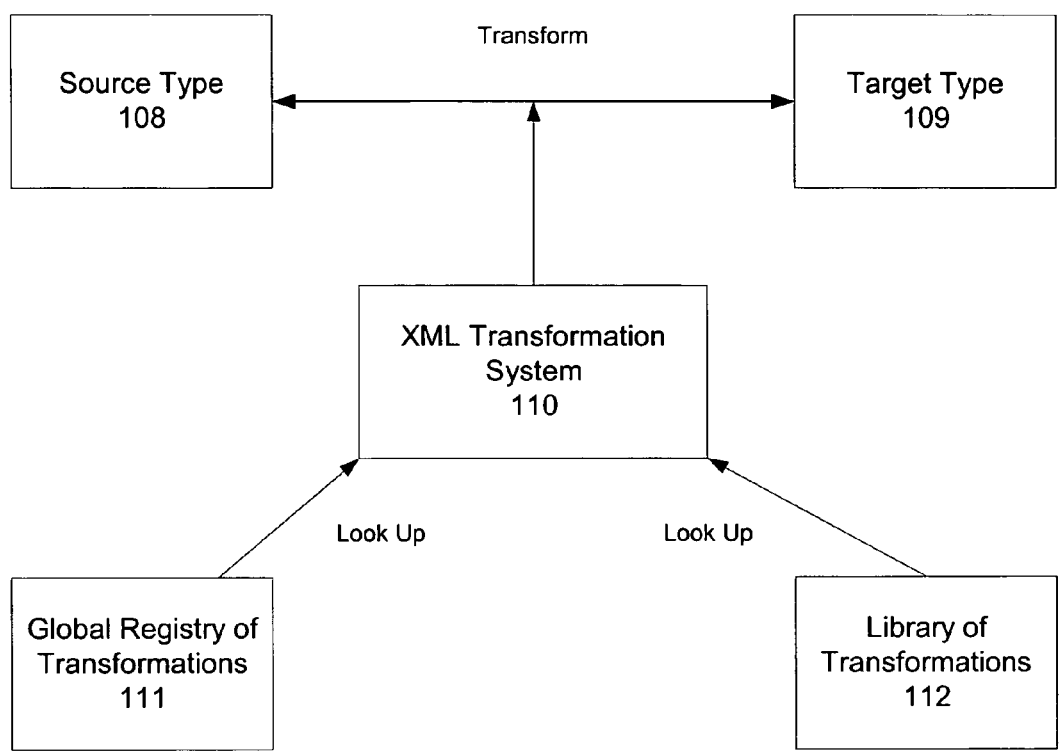
FIG. 10 is a diagram of an exemplary XML transformation system that can be used in accordance with embodiments of the present invention.

An example of an XML transformation system is shown in FIG. 10. In one embodiment, a global registry of transformations(XQueries) 111 can be used to get from one data type to another. Once a set of XQueries is obtained, the transformation system 110 can automatically look up whether a transformation exists from a source type 108 to a target type 109. In another embodiment, a library of transformations 112 can still be used, but instead of automatically transforming from a source type to a destination type, each transformation will be given a name. When a catalog item is given and a regular line item needs to be set, for example, the user can simply invoke the transformation by name before the set is called. In FIG. 9 where lines 13 and 14 are in bold type, there will be a function call between the 'set' and 'findCatalogItems' that tells the system to transform the catalog item to a line item. One reason to make this transformation explicit is that an invisible registry of transformations can be too abstract and "under the covers" for many users. If a user has data transformed, that user may want to actually see the name of the transformation in the code. If a user can see the name, it is possible for the user to navigate through the code to determine what the transformation does and how it affects the data. This can act as a check so the user can be sure that the transformation is understood, whether the code belongs to the user or someone else.

An alternative way to ensure that the quantity is correct is to define the CatalogItem through a line-item transformation to take two input arguments, such as a CatalogItem and an integer quantity. From this example, it can be seen that there is a global registry of transformations, indicating source types and target types. Sources and targets are allowed to be JAVA types. Whenever an automatic translation between two different types is require, the registry can be consulted. A registry can be used that allows a single JAVA® type to map to any number of different XML types, depending on the situation. A registry can also have the advantage that every mapping between any two given types need only be defined once, and then it is easily reusable.

In certain systems, difficulties may arise such that multiple versions of a schema may need to be dealt with at the same time in a single program. For this reason, there can be a provision for tagging each schema with a version identifier. The relevant JAVA® types and transformations can all be done separately, treating each version as its own type system.

In yet another example, a user may wish to write a Web service that takes a catalog item as input, or to expose an existing JAVA® function such as "findCatalogItem" as a Web service. For example, the following code could be written to expose findCatalogItem as a Web service in existing systems:

```
class MyWebService
{
    /** @jws:operation */
    CatalogItem findCatalogItem(int catalogID)
    {
        return MyDbUtilities.findCatalogItem(catalogID);
    }
}
```

Such an approach may be acceptable where a user is defining the proper WSDL type for that user's Web service. Unfortunately, the situation may be such that there is an existing XML schema describing the desired result type. For example, the results may be returned as a standard purchase order line-item element as in the examples above. In such case, the actual WSDL may not conform to the existing XML schema. An attempt can be made to create the proper schema using XML transformation, but other than providing a convenient syntax, existing systems provide no assistance in ensuring that the map conforms to the schema. Using a transformation registry in accordance with various embodiments of the present invention, however, it can be easy to ensure that the return result conforms to the proper type.

For example, the code could be modified as follows:

```
class MyWebService
{
    /**
     * @jws:operation
     * @jws:return-schema type="po:line-item"
     */
    CatalogItem findCatalogItem(int catalogID)
    {
        return MyDbUtilities.findCatalogItem(catalogID);
    }
}
```

The code above requires that there be a defined XML transformation that maps the CatalogItem type to the type of the po:line-item element. If there is none, the IDE will signal an error on the return-schema annotation. However, if there is a defined transformation, the return type of the Web service method can conform to the requested schema and the necessary schema can be included in the emitted WSDL.

In the example, such as can be seen in the line including "return-schema type=po:line-item," the system allows a user to return a catalog item, but have the line item in the XML. The system can go to a registry of XQueries and execute the instructions using an explicit XQuery. This embodiment provides for the association of an XQuery with an XML Map, the support of every schema, and a way to get simultaneous access to both the strongly-typed view and the XML view of the data.

Figure 11:
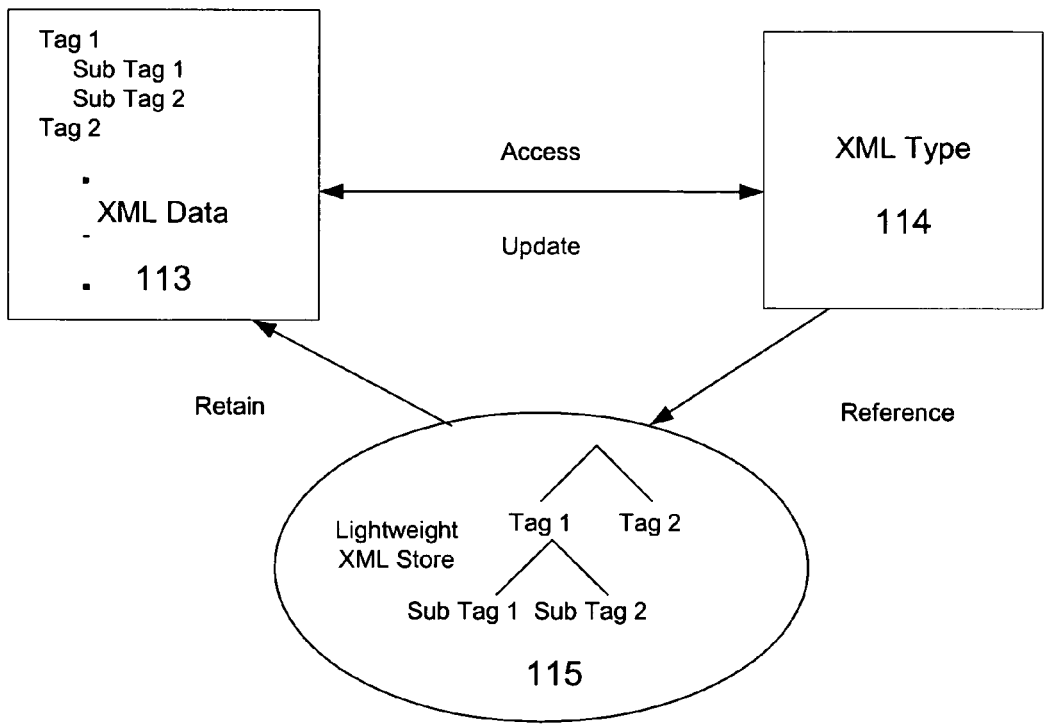
FIG. 11 is a diagram of an exemplary system for XML store that can be used in accordance with embodiments of the present invention.

As Shown in FIG. 11, when systems and methods in accordance with one embodiment load a piece of XML as an XML type 114, that XML type can be loaded into a lightweight internal XML store 115. This is similar to what can be done with the W3C Document Object Model (DOM), but is done in a more lightweight way, which can have complete fidelity to the original XML. The store is lightweight, since it only retains the XML data 113 either as a searchable index, or as in the current example, at approximately the text or tag level. Therefore, when a user has an XML type such as a purchase order, the user can simply have a handle to a location of one of these lightweight XML stores, which can resemble XML trees. When the user obtains the reference, there may not yet have been any marshaling. A getter can be called when a user calls a method such as "getLineItem," "getLineItem.getDesc," or "getQty," the getter being used to marshal, determine the type, and return the answer. This approach can be very time efficient, as only a portion of the data is being processed.

Systems and methods in accordance with some embodiments can keep an XML schema and a corresponding JAVA® type in sync. A user with a strongly-typed JAVA® can begin to add new line items or to change quantities, for example. If that user then wants to run an XPath path on the JAVA® type, the Xpath may need to be run on the XML data document in the current form of the data. In this case, if a user makes a modification to a document, either on the XML side or on the strongly-typed JAVA® side, the appropriate portion of the other side can be invalidated. When a user subsequently looks at that other side, the previously-invalidated information can be faulted in.

In order to compile an XML schema, it can be necessary to parse the schema, or XSD file, which is referred to as "schema for schema", In other words, an XSD file that represents the appropriate schema for the XSD files themselves. If a system is supposed to be able to handle 100% of the schema passed to the system, and the system generates convenient JAVA® accessibility, it can be expected that the system uses its own generated types for understanding XSD files when the system reads schema. A user should be able to take the schema for schema and compile that into JAVA® such that the system can simply use the JAVA®.

Figure 12:
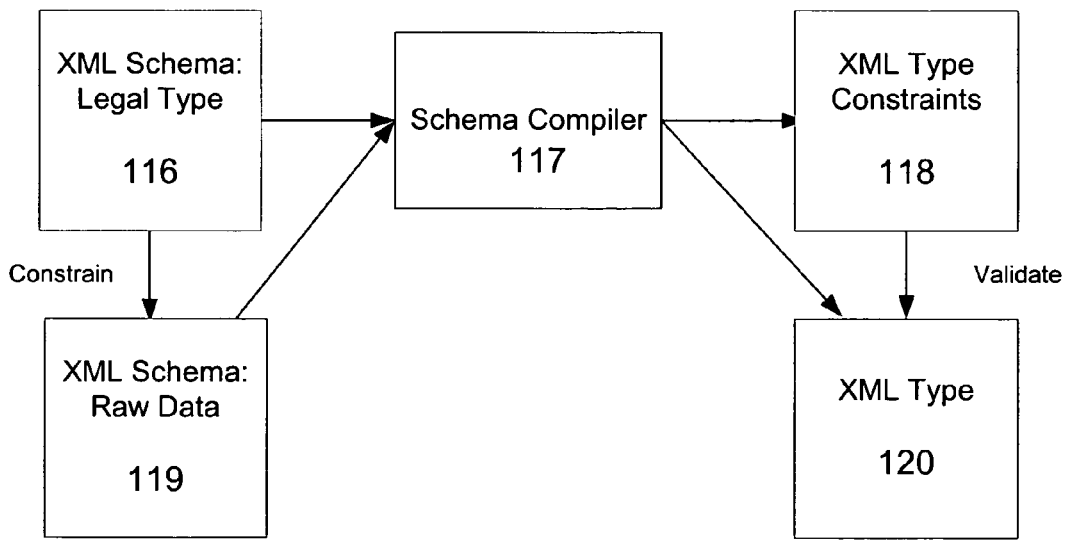
FIG. 12 is a diagram of an exemplary system for XML schemas that can be used in accordance with embodiments of the present invention.

Systems and methods in accordance with some embodiments, as shown in FIG. 12, there can be at least two parts to any piece of data, or XML data, including the legal type of the data 116 and the meaning of the raw data 119. The legal type of the data defines what kind of data is regarded as valid for the current application. A schema can contain very specific details regarding the legal types of data, and can in some instances contain some detail regarding the meaning of the data. Once the legal type of the data is known, it is possible to generate an automatic type that provides access to that data in a strongly-typed way. This is possible in part because the schema can identify all the valid sub-fields of a given data field. It is then possible to grant a user strongly-typed JAVA® access in the appropriate place(s). Even after a user has loaded the data and has the data in the appropriate type, the user may still not know what the data means. In such case, a schema compiler 117 can be used that understands the raw data. This is somewhat similar to what are known as compiler compilers, such as YACC ("Yet Another Compiler Compiler"), which are capable of taking an abstract grammar and compiling the abstract grammar into a syntax tree. Since XML is already a syntax tree, this is not a problem. XML is not, however, a constrained syntax tree. Any node can have a variety of elements beneath it in the tree. Once a user has a schema, which can be thought of as a grammar for XML, the user knows exactly what is supposed to be underneath any given node. Therefore, instead of using just a raw XML syntax tree, a user can take advantage of a schema-constrained syntax tree.

Systems and methods in accordance with one embodiment of the invention maintain each schema as a JAVA® type, including simple types. If a user has a schema that is a restriction of a simple type, it can be indicated in the schema. For instance, if a user-defined type to be an integer of a legal type, it has to be a five digit number between 10,000-99,000. It is not necessarily desirable to define this to be a simple integer type as in existing systems. Instead, the information can be generated into a JAVA® type. The name of the JAVA® type can then be generated from the schema, such as the name "restricted integer."

Another invariant that can be maintained by systems and methods in accordance with the present invention arises in cases where there are at least two types in a schema that are base types. If one of the types is a base type of the other, that relationship will connect the two types in JAVA®. A high-fidelity translation of typed systems can allow base types to be preserved.

A validation engine using complied XML type constraints 118 can also be used to allow a user to determine whether any relevant XML type 120 is valid according to the XML. For example, in XML a purchase order line item might have a description quantity, catalog number, and a price. There may also be a restriction in the appropriate XML schema that indicates 'description' is optional, but 'catalogItemNumber' is not optional. In JAVA® there is no way of indicating that a field is not optional, or cannot be null. As such, most people who do marshaling are not able to validate a bean. Validate methods in accordance with embodiments of the present invention can be used that allow a use to validate any bean against the XML type constraints, and to be informed of any validity problems.

In systems and methods in accordance with some embodiments, an XML type can be shared among multiple JAVA® components. An XBean can be automatically emitted, such as where an automatically generated XML type is defined for a user-defined component works. In such a case, XBeans representing parameters and return values can be auto-generated as inner classes to an XML control interface generated for the component. If the message types are actually shared across many components, it may not make sense to have private XBean types for each instance of the message. In such case, it should be possible to refer to an XBean type explicitly when defining a user-defined component, in order to explicitly control how the XML type of the component is shaped. For example:

```
package mypackage;
/**
 * @jws:xml-interface enable="true"
 */
class MyComponent
{
    /**
     * @jws:operation
     * parameter-xml-type="MyData"
     * return-xml-type="MyStringMessage"
     */
    String myOperation(String a, int i) { return a + i; }
}
```

By referencing the XBean type "MyData" in the component, such as for parameter-xml, it can be asserted that the bean has getters that correspond to the argument names. For example, getA should return a String, and getI should return an int. If these types do not line up, it may result in a compile-time error. For return-xml, it can be asserted that the bean type is the return value, or that it has a single property whose type matches the return value. By referencing the XML type, the XML schema is being referenced that defines the type of input and output messages to this method. The schemas can be reusable since they have names such as "MyData". A map is also being referenced between the XML and the JAVA® types. The map can be attached to the MyData type as metadata and, since it is attached to a named type, the map can be reusable.

A generated XML control interface that can be obtained when specifying explicit XBeans on the component can be as follows:

```
package mypackage;
interface MyComponentXMLControl
{
    /**
     * @jws:return-xml xml-type="MyStringResult"
     * @jws:parameter-xml xml-type="MyData"
     */
    XML myOperation(XML x);
}
```

In this example, the named XBean types are used to specify the xml schemas allowed, and there are no generated inner classes.

An XBean type can extend a base XML type, such that wherever XML can be passed, an XBean can be passed as well. In addition, any XBean can be attached to an XML data document, so wherever XML is available, an XBean can be created for convenient access to the data. In systems and methods in accordance with some embodiments, XBeans can be created easily and used in several different ways. For instance, an XBean can be created implicitly via the definition of a JWS (JAVA® Web services) method. An XBean can be created based on a parameter list of the function and the maps associated with the function. Also, an XBean can be created explicitly using a *.xbean file. A *.xbean file can have at least two different implementations, such as JAVA® Bean+Maps or XML+Query, each of which can freely use annotations. An example of implicitly creating a bean over a JWS operation might look like the following:

```
/**
 * @jws:operation
 * @jws:usebean beanName::creditCardInfo::
 **/
updateCreditCardInfo(String custId, String ccNumber, Date expDate,
Address addr)
```

This would implicitly create an XBean using the default maps for the operation. Applying a specific map to the operation would create the XBean using those maps for input and output. If the beanName is already defined, the existing bean can be used. A separate syntax can be used when creating a bean, instead of using an existing syntax.

A simple JAVA® Bean+Maps *.xbean file might look like the following: public interface xbean1

```
{
    /**
     * @xbean:property
     **/
    String name;
    /**
     * @xbean:property
     **/
    String address;
}
```

This would create a file with public get and set methods, as well as the standard XML that would be defined for this set of properties. A slightly more complex file would have a map attached, such as:

```
public interface xbean1 extends Java ® XBean
{
    /**
     * @jws:inputxml xml-map::
     * <PERSON><NAME>{name}</NAME><ADDRESS>
     {address}</ADDRESS>::
     **/
    /**
     * @xbean:property
     **/
    String name;
    /**
     * @xbean:property
     **/
    String address;
}
```

The above examples use individual JAVA® members as native storage. Equally important can be the use of XML as a native storage. On the opposite side, a simple file could use XQuery to return values. This might look as follows:

```
public interface xbean1 extends XMLXBean
{
    private XML xml;
    void xbean1(XML xmlParam)
    {
        xml = xmlParam;
    }
    /**
     * @jws:xquery statement :: $xml/name/text( ) ::
```

-continued

```
     **/
    String getName( );
}
```

Figure 13:
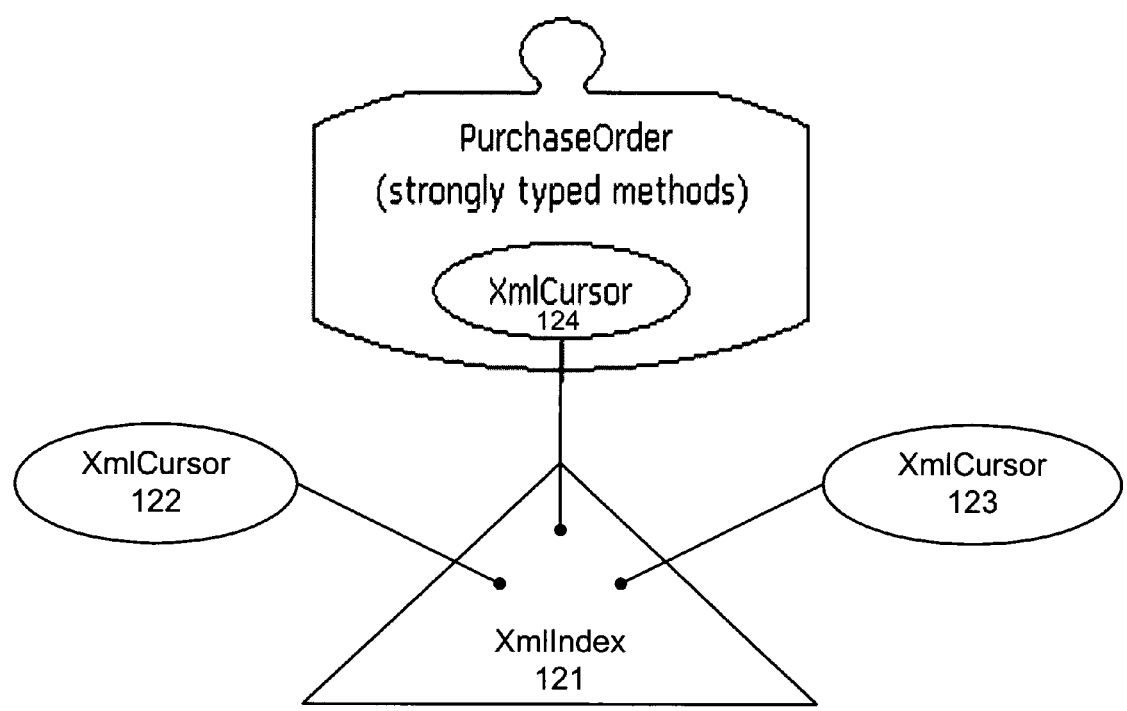
FIG. 13 is a diagram of an exemplary system for XML types that can be used in accordance with embodiments of the present invention.

In systems and methods in accordance with some embodiments, there can be two XML types: movable cursors and immovable values from a developer's point of view. As cursors are moved, the part of the XML data document viewed by it can change, so the types can be designed to operate anywhere within an XML data document. On the other hand, immovable values can be fixed in one place, so they can have strongly-typed methods that match the XML schema of the part of the data document that they reference. FIG. 13 shows an example of such an implementation, wherein XMLIndex 121 represents immovable value while XMLCursor 122 or 123 represents movable cursor of the underlying XML data. The actual implementation of a strong XML type may not use an XMLCursor, but it should be noted that the purchase order interface 124 provides the same kind of reference into underlying XMLIndex, even though it is immobile.

Although a user can use and manipulate a strongly type such as PurchaseOrder as if it were an ordinary JAVA® type, behind the type can be an implementation that directly accesses and manipulates the underlying XML data. For example, immediately after a value is set in a strongly type, the same value can be available from any cursor that uses XPath to search the same set of data.

The model shown in FIG. 13 can be useful when an XML data document is being held, queried, manipulated, and reused. At other times, it can be necessary to stream XML for one-time-use without ever holding on to the data document. For those situations there can be an XMLReader class such as an XML pull parser. Each XML Value object can stream itself out by supplying an XMLReader. There can also be an XMLIndex constructor that loads and indexes the contents of an XmlReader.

Figure 14:
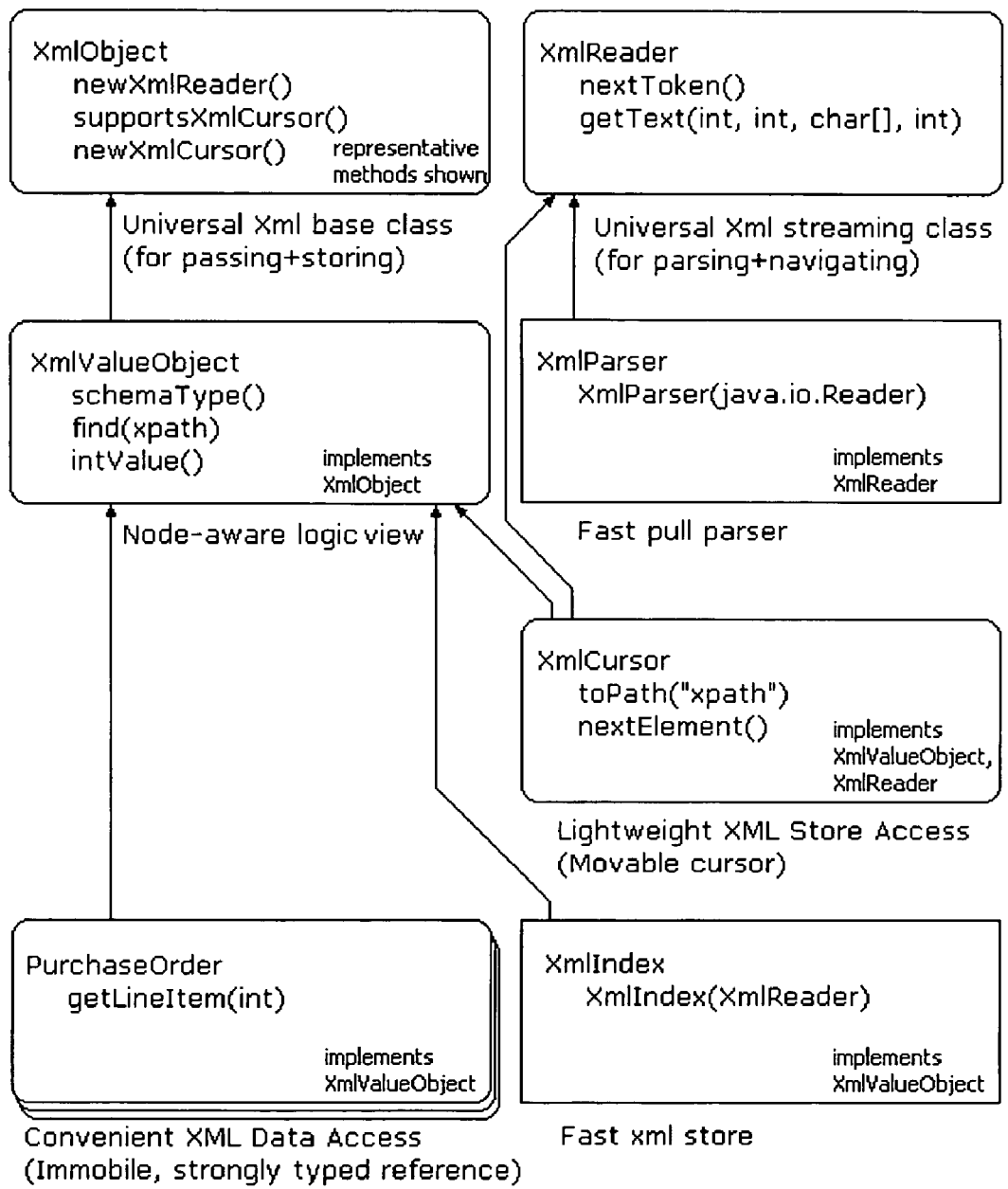
FIG. 14 is a diagram showing an exemplary hierarchy diagram that can be used in accordance with embodiments of the present invention.

FIG. 14 shows an exemplary class hierarchy diagram for an XML type API. In the Figure, the rounded boxes designate interfaces while the squared boxes designate concrete classes. A user starting from a file or a raw input stream can parse the XML using an XML Parser, then index the parsed file using an XML Index. These are the only two concrete classes shown, and these classes are factories for XML types that implement all the other interfaces.

XML types can add the schema to the JAVA® runtime model. For example, every schema can compile into a JAVA® type at compile time. This can include both complex types and simple types. Precompiled types such as XmlString and XmlDate can be used for the fundamental and simple types built-in to XML Schema. XMLObject itself can correspond to the xsd:anyType. In addition, for each schema, a pointer resource can be generated into the target class hierarchy that provides a map from all schemas with a given name into corresponding JAVA® type names.

Multiple schemas can be allowed to have the same XML name, but different types with the same name may be tagged with different "XML world" names. Only one world may be allowed to be the default world. One way to control type generation is through an .xval file adjacent to the .xsd file at compile time. At runtime, indexed XML can be automatically schema-aware. The visibility of schemas can be tied to the current ClassLoader. A thread-local index of visible schemas can be maintained. When a new schema is requested via fully-qualified XML name, a ClassLoader.getResourceAs- Stream call can be used to locate a pointer to the corresponding JAVA® type, such as in the default world. Lookups in a specific world can also be done. An implementation of XMLIndex can automatically resolve all XML to types using such a scheme. If no "xml world" is specified, a default world can be used. Other alternate views can also be specified that allow different versions of schemas to be used.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "type" is used for both XML and JAVA® in the embodiments of the systems and methods described above, it will be evident that such concept can be interchangeably used with equivalent concepts such as, interface, shape, class, object, bean, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A computer-implemented system to marshal and unmarshal data between an extensible markup language (XML) and an object-oriented programming language, comprising:

an XML schema which defines an XML data; and
a compiler, running on one or more processors of the computer-implemented system, to generate an object-oriented programming language type from the XML schema, wherein the object-oriented programming language type is automatically generated for an object-oriented programming language component as an inner class to an XML control interface for the object-oriented programming language component, wherein the object-oriented programming language type corresponds to the XML schema and provides XML-oriented data manipulation, wherein the object-oriented programming language type extends from a base type that allows the combination of an XML type system and an object-oriented programming language type system and can access and manipulate the XML data from within the object-oriented programming language type system, wherein the object-oriented programming language type executes one or more XML data operations provided by the XML type system, on the XML data, to generate one or more result sets in the object-oriented programming language type system, wherein each of the one or more XML data operations is one of an XML data query operation;
an XML data transformation operation; and
an XML data iteration operation.

2. The computer-implemented system according to claim 1, wherein:

the compiler is capable of generating the object-oriented programming language type based on the definition of a web service method.

3. The computer-implemented system according to claim 1, wherein:

the compiler is capable of generating the object-oriented programming language type based on a definition file.

4. The computer-implemented system according to claim 1, wherein:

the compiler is capable of compiling an object-oriented programming language project into one or more regular object-oriented programming language types.

5. The computer-implemented system according to claim 1, wherein:

the object-oriented programming language type can be a movable cursor, capable of reading anywhere within the XML data.

6. The computer-implemented system according to claim 1, wherein:

the object-oriented programming language type can be an immovable value, capable of referencing a fixed part of the XML data.

7. The computer-implemented system according to claim 1, wherein:

the object-oriented programming language type can be shared among multiple object-oriented programming language components.

8. The computer-implemented system according to claim 1, wherein:

the object-oriented programming language type is capable of updating the XML data within the object-oriented programming language.

9. The computer-implemented system according to claim 1, wherein:

the object-oriented programming language type is capable of accessing and updating object-oriented programming language data using object-oriented programming language type methods.

10. The computer-implemented system according to claim 1, wherein:

the object-oriented programming language type is capable of accessing and updating a database.

11. The computer-implemented system according to claim 1, further comprising:

an XML schema capable of defining legal types of the XML data, which include constraints on data types and ranges of the XML data; and constraints on the data types and ranges of the object-oriented programming language type.

12. The computer-implemented system according to claim 11, wherein:
the compiler is capable of generating constraints on the object-oriented programming language type from the XML schema on legal types of the XML data.

13. The computer-implemented system according to claim 11, wherein:
the constraints on the object-oriented programming language type are capable of validating the object-oriented programming language type.

14. The computer-implemented system according to claim 1, wherein:
the object-oriented programming language type is shared among multiple object-oriented programming language components.

15. The computer-implemented system according to claim 1, wherein:
the object-oriented programming language type is both validated by one or more schema in XML type system and checked under the object-oriented programming language type system.

16. A method to marshal and unmarshal data between an extensible markup language (XML) and an object-oriented programming language, comprising:
defining an XML data using an XML schema;
generating, via a compiler running on one or more processors, an object-oriented programming language type from the XML schema, wherein the object-oriented programming language type is automatically generated for an object-oriented programming language component as an inner class to an XML control interface for the object-oriented programming language component, wherein the object-oriented programming language type corresponds to the XML schema and provides XML-oriented data manipulation, wherein the object-oriented programming language type extends from a base type that allows the combination of XML and object-oriented programming language type systems and can access and manipulate the XML data from within the object-oriented programming language type system; and
executing, via the object-oriented programming language type, one or more XML data operations provided by the XML type system, on the XML data, to generate one or more result sets in the object-oriented programming language type system, wherein each of the one or more XML data operations is one of
an XML data query operation;
an XML data transformation operation; and
an XML data iteration operation.

17. The method according to claim 16, further comprising:
generating the object-oriented programming language type based on the definition of a web service method.

18. The method according to claim 16, further comprising:
generating the object-oriented programming language type based on a definition file.

19. The method according to claim 16, further comprising:
compiling an object-oriented programming language project into one or more regular object-oriented programming language types.

20. The method according to claim 16, further comprising:
utilizing the object-oriented programming language type as a movable cursor to read anywhere within the XML data.

21. The method according to claim 16, further comprising:
utilizing the object-oriented programming language type as an immovable value to reference a fixed part of the XML data.

22. The method according to claim 16, further comprising:
sharing the object-oriented programming language type among multiple object-oriented programming language components.

23. The method according to claim 16, further comprising:
updating the XML data within an object-oriented programming language via the object-oriented programming language type.

24. The method according to claim 16, further comprising:
accessing and updating object-oriented programming language data using object-oriented programming language type methods.

25. The method according to claim 16, further comprising:
accessing and updating a database via the object-oriented programming language type.

26. The method according to claim 16, further comprising:
defining legal types of the XML data via an XML schema, which include constraints on data types and ranges of the XML data.

27. The method according to claim 26, further comprising:
generating constraints on the data types and ranges of the object-oriented programming language type from the XML schema on legal types of the XML data.

28. The method according to claim 26, further comprising:
validating the object-oriented programming language type using the constraints on the object-oriented programming language type.

29. A machine readable storage medium having instructions stored thereon that when executed by a processor cause a system to:
define an extensible markup language (XML) data using an XML schema;
generate, via a compiler running on one or more processors, an object-oriented programming language type from the XML schema, wherein the object-oriented programming language type is automatically generated for an object-oriented programming language component as an inner class to an XML control interface for the object-oriented programming language component, wherein the object-oriented programming language type corresponds to the XML schema and provides XML-oriented data manipulation, wherein the object-oriented programming language type extends from a base type that allows the combination of XML and object-oriented programming language type systems and can access and manipulate the XML data from within the object-oriented programming language type system; and
execute, via the object-oriented programming language type, one or more XML data operations provided by the XML type system, on the XML data, to generate one or more result sets in the object-oriented programming language type system, wherein each of the one or more XML data operations is one of
an XML data query operation;
an XML data transformation operation; and
an XML data iteration operation.

30. The machine readable storage medium of claim 29, further comprising instructions that when executed cause the system to:
   generate the object-oriented programming language type based on the definition of a web service method.

31. The machine readable storage medium of claim 29, further comprising instructions that when executed cause the system to:
   generate the object-oriented programming language type based on a definition file.

32. The machine readable storage medium of claim 29, further comprising instructions that when executed cause the system to:
   compile an object-oriented programming language project into one or more regular object-oriented programming language types with the compiler.

33. The machine readable storage medium of claim 29, further comprising instructions that when executed cause the system to:
   utilize the object-oriented programming language type as a movable cursor to read anywhere within the XML data.

34. The machine readable storage medium of claim 29, further comprising instructions that when executed cause the system to:
   utilize the object-oriented programming language type as an immovable value to reference a fixed part of the XML data.

35. The machine readable storage medium of claim 29, further comprising instructions that when executed cause the system to:
   share the object-oriented programming language type among multiple object-oriented programming language components.

36. The machine readable storage medium of claim 29, further comprising instructions that when executed cause the system to:
   update the XML data within an object-oriented programming language via the object-oriented programming language type.

37. The machine readable storage medium of claim 29, further comprising instructions that when executed cause the system to:
   access and update object-oriented programming language data using regular object-oriented programming language type methods.

38. The machine readable storage medium of claim 29, further comprising instructions that when executed cause the system to:
   access and update a database via the object-oriented programming language type.

39. The machine readable storage medium of claim 29, further comprising instructions that when executed cause the system to:
   define legal types of the XML data via an XML schema, which include constraints on data types and ranges of the XML data.

40. The machine readable storage medium of claim 39, further comprising instructions that when executed cause the system to:
   generate constraints on the object-oriented programming language type from the XML schema on legal types of the XML data.

41. The machine readable storage medium of claim 39, further comprising instructions that when executed cause the system to:
   validate the object-oriented programming language type using the constraints on the object-oriented programming language type.

* * * * *

UNITED STATES PATENT AND TRADEMARK OFFICE
CERTIFICATE OF CORRECTION

PATENT NO. : 7,650,591 B2  Page 1 of 1
APPLICATION NO. : 10/762814
DATED : January 19, 2010
INVENTOR(S) : David Bau It is certified that error appears in the above-identified patent and that said Letters Patent is hereby corrected as shown below:

On the Title Page, Item (*) Notice:
Delete "569 days"
Insert -- 739 days --.

On the Title Page, Item (56) on page 2, under "Other Publications", line 12, delete "Wikipedla," and insert -- Wikipedia, --, therefor.

In column 1, line 10, delete "TN" and insert -- IN --, therefor.

In column 1, line 49, delete "staffs" and insert -- starts --, therefor.

In column 4, line 8, delete "bean" and insert -- bean, --, therefor.

In column 4, line 50, delete "seqence" and insert -- sequence --, therefor.

In column 7, line 12, delete "require," and insert -- required, --, therefor.

In column 9, line 47, after "JAVA®" insert -- , --.

In column 11, line 18, delete "xbeanl" and insert -- xbean1 --, therefor.

In column 12, line 23, delete "XMLIndex ," and insert -- XMLIndex, --, therefor.

Signed and Sealed this

Fourteenth Day of September, 2010

David J. Kappos
*Director of the United States Patent and Trademark Office*